(12) United States Patent
Blot-Carretero et al.

(10) Patent No.: US 6,251,270 B1
(45) Date of Patent: Jun. 26, 2001

(54) FUEL CIRCUIT WITH PROTECTED MAIN FILTER

(75) Inventors: Marie Trinité Blot-Carretero, Maincy; Jean-Marie Brocard, Rubelles, both of (FR)

(73) Assignee: Societe Nationale d'Etude et de Consrtuction de Moteurs d'Aviation "SNECMA", Paris (FR)

( * ) Notice: Subject to any disclaimer, the term of this patent is extended or adjusted under 35 U.S.C. 154(b) by 0 days.

(21) Appl. No.: 09/481,382

(22) Filed: Jan. 12, 2000

(30) Foreign Application Priority Data

Jan. 14, 1999 (FR) .................................................. 99 00294

(51) Int. Cl.$^7$ ........................... B01D 35/30; B01D 27/08; B01D 35/02; F02C 7/22
(52) U.S. Cl. ........................ 210/186; 210/416.4; 210/443; 244/135 R
(58) Field of Search ................................ 210/186, 416.4, 210/443, 444; 244/135 R, 134 R; 60/39.092, 39.093, 39.281, 736

(56) References Cited

U.S. PATENT DOCUMENTS

| | | | |
|---|---|---|---|
| 2,865,442 | * | 12/1958 | Halford et al. . |
| 3,675,772 | * | 7/1972 | Zhukovsky et al. . |
| 4,073,136 | * | 2/1978 | Symon . |
| 4,201,044 | * | 5/1980 | Dodd . |
| 4,683,055 | | 7/1987 | Bosch et al. . |
| 4,741,152 | | 5/1988 | Burr et al. . |
| 4,783,271 | * | 11/1988 | Silverwater . |
| 4,899,535 | | 2/1990 | Dehan et al. . |
| 5,203,174 | | 4/1993 | Meyer . |

FOREIGN PATENT DOCUMENTS

| 0 166 160 | 1/1986 | (EP) . |
|---|---|---|
| 2 259 587 | 3/1993 | (GB) . |

* cited by examiner

Primary Examiner—Thomas M. Lithgow
(74) Attorney, Agent, or Firm—Oblon, Spivak, McClelland, Maier & Neustadt, P.C.

(57) ABSTRACT

A main filter for an airplane fuel circuit or a fuel circuit for any type of mechanism, the filter having a first and second entry, which go directly into a chamber containing a filtering unit, the first entry receiving the fuel at a temperature essentially equal to that of the second entry which receives a hotter fuel which has passed through a heat exchanger. The filter prevents clogging due to ice formation on the filtering unit of the filter or at least inhibits such clogging. A fuel circuit using such a filter is also disclosed.

5 Claims, 3 Drawing Sheets

FUEL CIRCUIT WITH PROTECTED MAIN FILTER

DESCRIPTION

1. Field of the Invention

The invention involves the area of filters for fuels and particularly filters used in fuel circuits of aeroplane engines. It also involves the fuel circuits which use such filters.

2. Discussion of the Background

Filters, and particularly fuel filters, have long been known. They have an air-tight chamber, in a cylindrical shape for example. This chamber contains a filtering element. A fuel input and output are located on either side of the filtering element so that the fuel which leaves must go through the filtering element. An example of an aeroplane fuel circuit using such a filter is shown schematically in FIG. 1.

Fuel from a fuel tank which is not shown is brought by a pipe 1 to a low-pressure pump 2 which is a booster pump for a main pump 3 located downstream in the circuit. A main filter 4 receives the fuel from the low-pressure pump 2 and also the fuel from the return circuits which will be described later. The filter 4 includes, in a known fashion as described above, a fuel input 5, located upstream, a fuel output 6 located downstream, and an air-tight chamber 7 delimited by a case 40. In a manner which is known but not shown in FIG. 1, the main filter 4 has a filtering element 8. At the output from the main pump 3, the fuel goes through a doser 9. The doser 9, which is servo controlled, releases only the quantity of fuel needed for operation of the engines as a function of the flight conditions. Branches 10, 11 located upstream from the doser 9 and downstream from the main pump 3, direct the fuel to the servo mechanisms 12 which use the pressure of the fuel from the main pump 3 for their operation, and also to the heat exchanger 13 through a regulating valve 15.

For the explanations which follow, some indications regarding fuel temperatures will be needed. Temperatures in degrees Celsius corresponding to a lower limit exterior temperature for a type Al fuel are given for information purposes for different locations in the circuit shown in FIG. 1. The fuel in the fuel tank is at a temperature close to the outside temperature at the flight altitude during a flight at 54° C. for example as shown in FIG. 1. This low temperature could interfere with proper functioning of the servo mechanisms 12 and for this reason, means 14 for fuel heating are installed upstream from the servo mechanisms 12. This low temperature is however advantageously used to cool various means of operation of the airplane and particularly the engines. This cooling occurs by means of the main heat exchanger 13 mentioned above. The fuel leaving the servo mechanisms 12 is taken by a pipe 16 upstream from the main heat exchanger 13 when it is combined with the fuel leaving the regulating valve 15. When it leaves the main heat exchanger 13, the fuel may be in the conditions shown in FIG. 1 at a temperature of about 7°. This fuel is drawn downstream from the low pressure pump 2, and upstream from the main filter 4, by a pipe 17, which forms the downstream extremity of the return circuit mentioned above. This return circuit includes the pipe 16 downstream from the servo mechanism 12, the branch 11 leading to the regulating valve 15 and the circuit of the main heat exchanger 13 terminated by the pipe 17. Given the flow of fuel in the various elements of the circuit which has just been described and the operating conditions for the example chosen, the fuel temperature upon entry into the main filter 4 is about −17° C. There can of course be wide fluctuations in this temperature because it is the result of a mixture of the fuel coming from the fuel tank and for which the temperature depends on the initial flight conditions, the flight time, and the outside temperatures encountered, and also the fuel from the return circuit for which the temperature depends on the flight time, the outside temperatures encountered, but also the fuel flow needed for the engines, servo mechanisms, and heat exchanges with the cooling systems. It is thus possible that the fuel entering the main filter 4 of the fuel circuit would have temperatures close to or equal to −2° C. or −9° C., which are temperatures which favor the formation of flakes of frost which rapidly soil the filtering element 8 of the filter 4 to the point of clogging it. Detection of this phenomenon leads to the opening of a by-pass 18 which avoids the clogged filter. Other by-passes 18 which avoid other elements of the fuel circuit were indicated in FIG. 1 but will not be discussed because this is not necessary for understanding the invention. In the case of ice formation on the filter 4, the fuel continues to circulate through the by-pass 18, and in particular it feeds the engine injectors, but it is no longer filtered, thus running the risk of soiling or even clogging one of several injectors, which would hinder engine operation. The circuit which has just been described in conjunction with FIG. 1 is a generic example of a recent circuit with almost as many variations as there are engines. In addition, the description given is brief and only intended to clarify the reasons for which the fuel temperature is variable as a function of the parts of the circuit in which the fuel is contained. In the past there were turbomachines which regulated fuel reheating circuits to obtain fuel at a temperature which does not lead to ice formation. These regulated circuits are costly to install and their operation is energy-consuming. The filter according to the invention aims to reduce the probability of clogging or partial obstruction of the main filter of a fuel circuit by ice formation. This decreased probability is obtained without a costly or bulky system and without making the circuit complicated.

SUMMARY OF THE INVENTION

The filter according to the invention is a filter for a fuel circuit with an air-tight chamber formed by a case containing a filtering element, a fuel output oriented so that the fuel which enters the air-tight chamber can only reach the output through the filtering element, the filter being characterised in that it has two entries, a first one and a second formed by openings in the case, these two entries leading directly to the chamber containing the filtering element.

In a circuit including a filter according to the invention, the first entry is reserved for example for the fuel which has not received any heat treatment and which arrives from the fuel tank. The second entry will be reserved for the fuel which has undergone heating and which arrives by the return circuit. The filtering element thus receives directly from one side a "hot" fuel which does not risk freezing, and from the other side a cold fuel which is usually at a temperature below −9°, i.e. a temperature below the temperature at which the water contained in the fuel can freeze in the form of flakes which rapidly obstruct the filter. The hot and cold fuels are introduced directly into the chamber containing the filter element so as to avoid a prior mixing of the hot and cold fuels. The mixtures of hot and cold fuels formed by turbulence at the time of entry into the filter are unstable such that, if freezing is beginning at some place in the filtering element, it can reasonably be hoped that these frost conditions will themselves be unstable and that the freezing will not continue. If the cold fuel is at a temperature which allows freezing, the filter will not totally freeze but will rather have a cold spot which will freeze and clog first and a hotter spot which will freeze later. The double entry, hot and cold, allows for a degree of control, a certain orientation of the mechanism of freezing of the surface of the filtering element leading to prolonging of the functioning time without opening of the by-pass. This is due to the fact that the head loss at the filter is sufficiently low because a portion of the filtering surface remains frost-free.

The filter according to the invention can advantageously have within the air-tight chamber separating partitions which hinder the mixing of the cold fuel from one input with the hot fuel from the other input. The segregation of the hot and cold fuels is thus increased.

BRIEF DESCRIPTION OF THE DRAWINGS

An example of an embodiment of the filter according to the invention is described below in connection with the drawings in appendix in which.

DESCRIPTION OF THE PREFERRED EMBODIMENTS

In all of the figures, elements with the same function have the same reference numbers. The arrows indicate the direction of fuel circulation.

Figure 2:
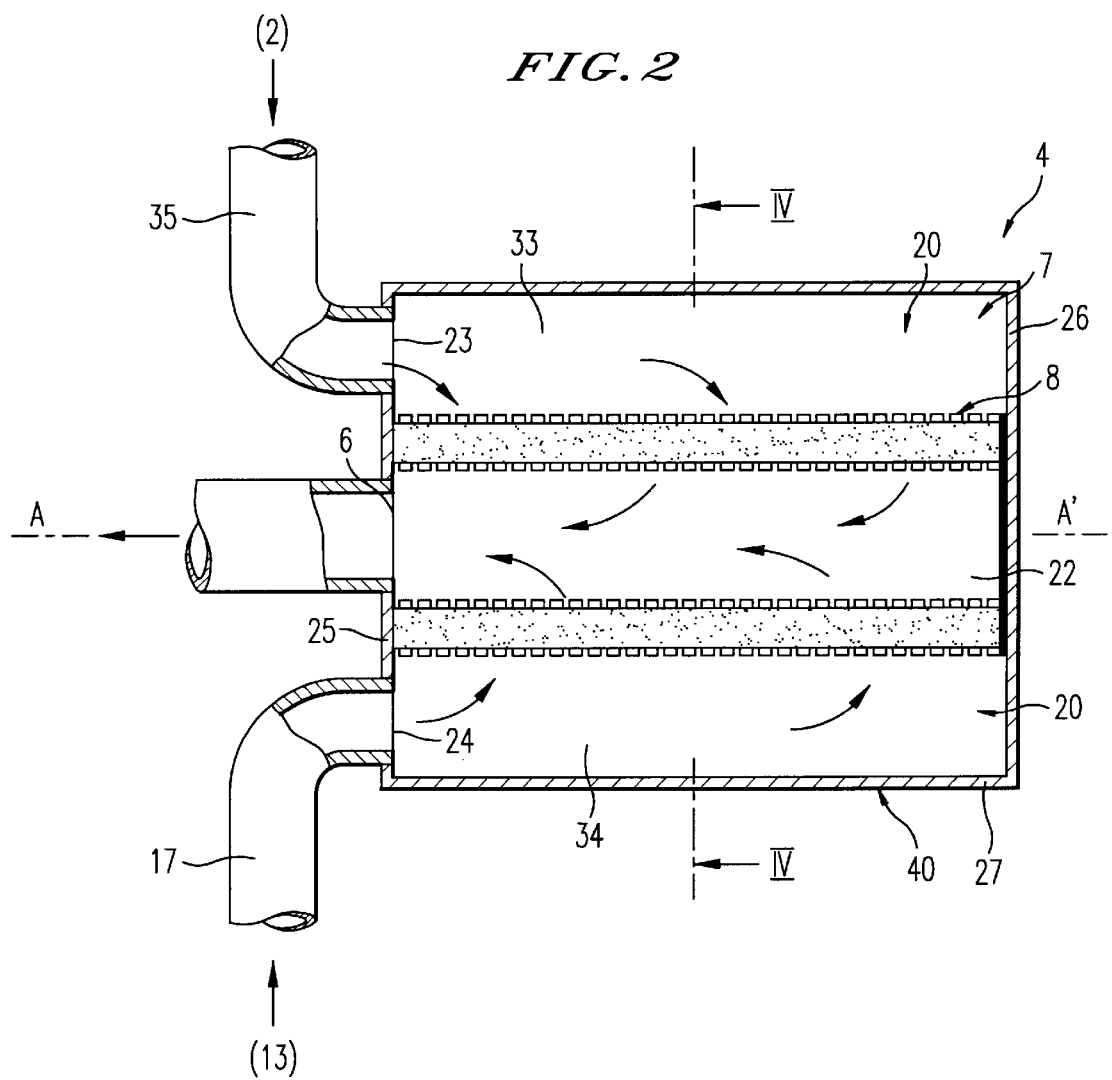
FIG. 2 is a longitudinal section along III—III of FIG. 3 of a double-entry filter according to the invention and also showing the modification of the fuel circuit using a double-entry filter according to the invention.
Figure 3:
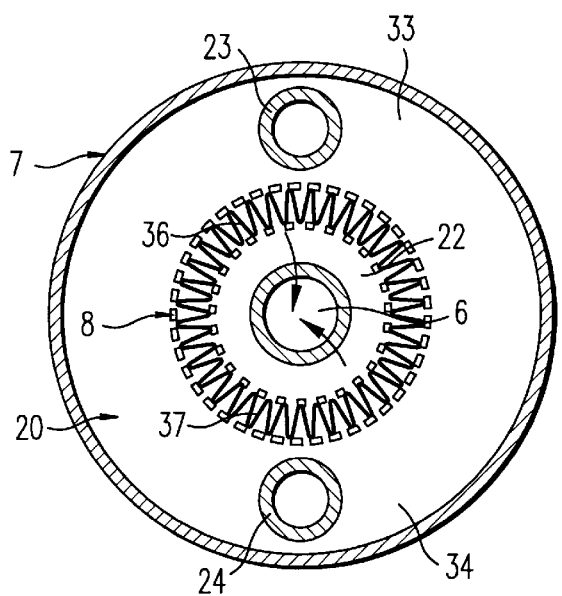
FIG. 3 is a cross-section along IV—IV of FIG. 2 of a double-entry filter according to the invention.
Figure 4:
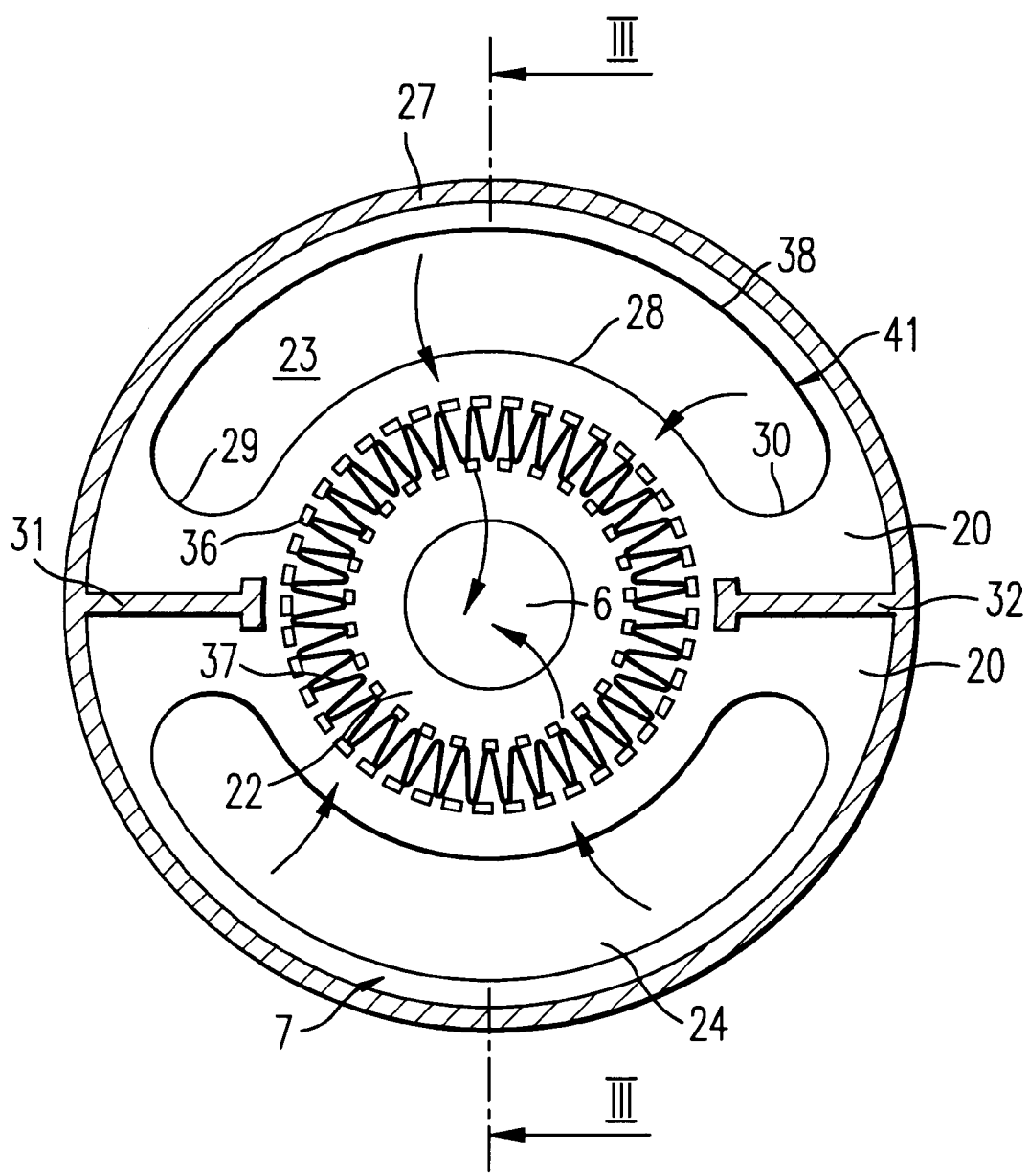
FIG. 4 is a cross-section according to III—III of FIG. 2 of a double-entry filter according to a variant of the invention.

FIG. 2 and 3 are respectively longitudinal cross sections of a double-entry filter 4 according to the invention. A first entry 23 receives the cold fuel from the fuel tank, this fuel not having undergone any heat treatment. A second entry 24 receives the fuel from the return circuit, some of which at least has been heated, and which for this reason is called hot fuel, even though its temperature remains low, i.e. on the order of ten degrees Celsius. These entries 23, 24 introduce the fuel into the air-tight chamber 7 which in the example shown and without this example being limiting, is enclosed in a cylindrical case 40 along the AA' longitudinal axis, The chamber is thus delimited by two transverse plates 25, 26 and a barrel 27 parallel to longitudinal axis AA' which compose the case 40. Advantageously, at least one of the entries 23, 24 is composed of an opening 41 in the form of a bean in one or the other of the plates 25, 26. In the example shown, the opening 41 is delimited by two concentric circle arcs 28, 38, each having an extremity, and by connecting curves 29, 30. Each of the connecting curves 29, 30 links two extremities of the circle arcs 28, 38. The circle arcs 28, 38 delimiting the beans are preferably centered on axis AA'. In the example shown in FIG. 3, the two entries 23, 24 are arcuate shaped but only the edges thereof are numbered. The chamber 7 has a filtering element 8 in a known manner. This filtering element 8 separates the chamber into two volumes, one for receiving 20, another for output 22. The entry openings 23, 24 of the chamber 7 are located on the same side with respect to the filtering element 8, so that they go into the receiving volume 20. The opening of the output 6 is located on the other side of the filtering element 8 so that it receives the fuel after it has gone through the filtering element 8. In the example shown, the receiving volume 20 is located on the periphery of the chamber 7, and the output volume 22 in the center. The two entry openings 23, 24 occupy positions which are diametrical to each other so that the cold fuel tends to remain in the part 33 of the receiving volume 20 located on the side of the first entry 23, while the hot fuel tends to remains in the part 34 of the receiving volume 20 located on the side of the second entry 24. In the event of frost conditions, only the part 36 of the filtering element 8 located on the side of the first entry 23 will tend to become obstructed with frost flake deposits. The other part 37 of the filtering element 8 which receives the hot fuel will remain open so that the head loss at the filtering element 8 will be insufficient to trigger opening of the filter by-pass. In order to reinforce the segregation of the hot and cold fuels, partitions 31, 32 coming out of the case 40 can advantageously be placed as shown in FIG. 4 within the volume 20 between the two parts 33 and 34. The partitions 31, 32 can, as shown in FIG. 4, have a width equal to the distance between the filtering element 8 and the lateral surface 27. They can also have a lesser width and not cover the entire axial length of the chamber 7 or they can be punched. In the example shown, the partitions 31, 32 stick out in a manner diametrical to the barrel 27.

Figure 1:
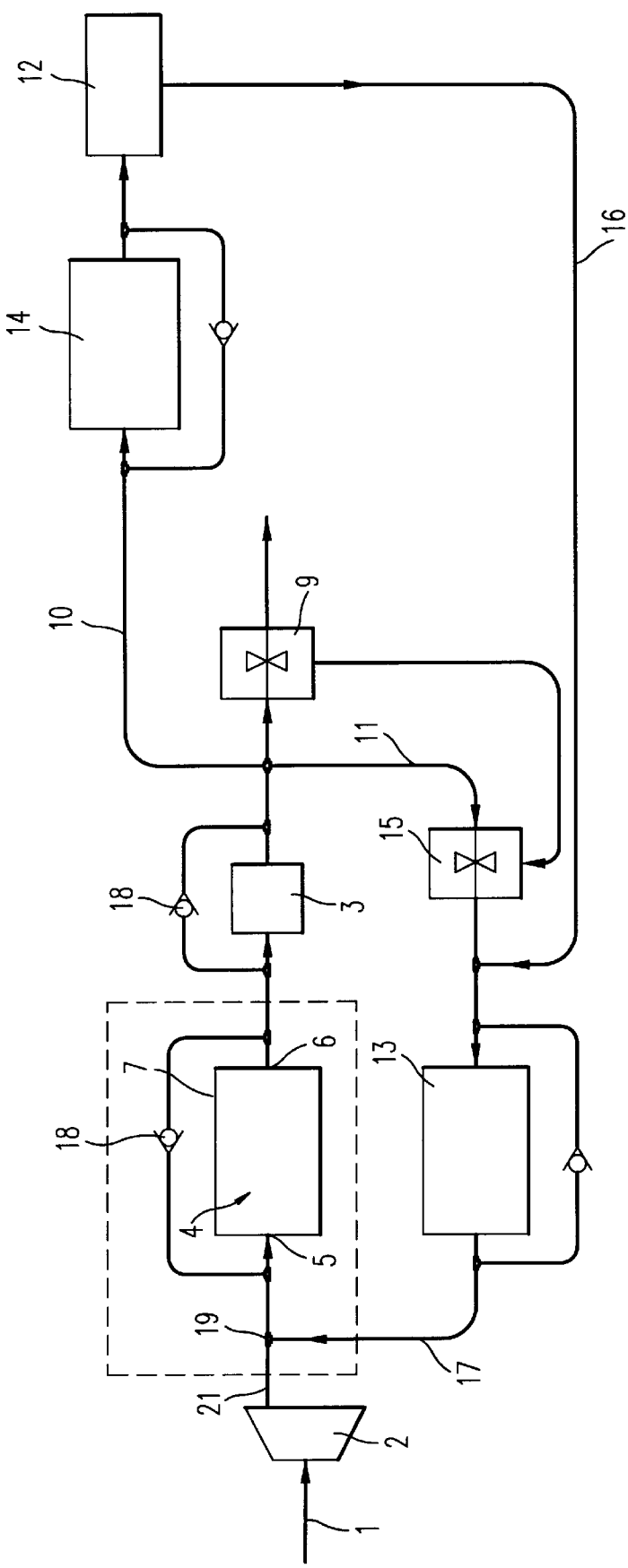
FIG. 1, already described, represents an example of a known fuel circuit diagram with a known filter.

The modification of the circuit for use of a filter according to the invention will now be explained with reference to FIG. 2. Firstly it should be noted that a filter according to the invention can be used with any circuit of which the parts contain fuel at different temperatures. It should further be noted that the use of a filter according to the invention only slightly disturbs the general arrangement of the circuit. FIG. 2 shows the modification made by the use of a filter according to the invention to the part of the circuit surrounded by a broken line box in FIG. 1. In FIG. 1 the junction between the cold fuel directed toward the sole entry 5 of the filter 4 and a pipe 21 occurs at a junction coupling 19 of the pipe 21, and the pipe 17 which takes the hot fuel into the main fuel circuit. This coupling 19 is located upstream from the filter 4. In FIG. 2, the only modification made to the circuit is the elimination of this pipe coupling 19. The junction of the hot and cold fuels or more generally fuels at different temperatures, occurs in the filter into which the cold fuel enters through the entry 23 while the hot fuel enters by entry 24. The first entry 23 is connected to a pipe 35 from the pump 2 which takes fuel from a aeroplane fuel tank, the second entry 24 being connected to the pipe 17 coupled to the heat exchange 13 in which the fuel was used as a cooling fluid.

It should be stressed that the embodiments which have been described in relation to FIGS. 2 to 4 are only examples and that embodiments according to the invention could be adapted to any known shape of filter, which could be modified to introduce an additional entry and possibly one or several segregating partitions for the hot and cold fuels, these partition(s) coming out of the case towards the interior of the case between the two entries 23, 24. Such a filter could be used not just for an airplane circuit but also for other devices.

What is claimed is:

1. A filter for a fuel circuit containing a filtering element, a fuel output arranged so that the fuel entering the air-tight chamber can only reach the output through the filtering element, said filter comprising:

a case having first and second entries, said case forming an air-tight chamber, and said first and second entries extending directly into the chamber containing the filtering element, wherein the air-tight chamber containing said filtering element comprises a case equipped with openings forming said first and second entries to the chamber, said case including at least one partition extending between said first and second entries.

2. A main filter according to claim 1, wherein said case is cylindrically shaped along an axis formed by an axially extending barrel member and first and second traversely extending plates.

3. Main filter according to claim 2, wherein at least one of the entry openings is circularly-shaped.

4. An airplane fuel circuit, which comprises:

a case having first and second entries, said case forming an air-tight chamber and said first and second entries extending directly into the chamber containing the filtering element, wherein the air-tight chamber containing said filtering element comprises a case equipped with openings forming said first and second entries to the chamber, said case including at least one partition extending between said first and second entries, the first entry receiving fuel at a temperature different from that of the fuel received by the second entry.

5. An airplane fuel circuit according to claim 4, which comprises a pump, a pipe connected to said pump for drawing fuel from a fuel tank, the second entry being connected to a pipe receiving fuel from a heat exchanger wherein the fuel comprises a cooling fluid.

* * * * *

UNITED STATES PATENT AND TRADEMARK OFFICE
CERTIFICATE OF CORRECTION

PATENT NO. : 6,251,270 B1
DATED : June 26, 2001
INVENTOR(S) : Blot-Carretero et al.

It is certified that error appears in the above-identified patent and that said Letters Patent is hereby corrected as shown below:

Title page,
Item [73], the Assignee's name is spelled incorrectly. It should read as follows:

Title page,
-- (73) Assignee: Societe Nationale d' Etude et de Construction de Moteurs d'Aviation "SNECMA", Paris (FR) --

Signed and Sealed this

Second Day of October, 2001

Attest:

NICHOLAS P. GODICI
*Attesting Officer*      *Acting Director of the United States Patent and Trademark Office*